United States Patent
Kang et al.

(10) Patent No.: US 11,093,331 B2
(45) Date of Patent: Aug. 17, 2021

(54) METHOD, DEVICE AND COMPUTER PROGRAM PRODUCT FOR DETECTING INCOMPLETE WRITE OF DATA

(71) Applicant: EMC IP Holding Company LLC, Hopkinton, MA (US)

(72) Inventors: Jianbin Kang, Beijing (CN); Jian Gao, Beijing (CN); Jibing Dong, Beijing (CN); Ruiyong Jia, Beijing (CN); Xinlei Xu, Beijing (CN); Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 16/223,843

(22) Filed: Dec. 18, 2018

(65) Prior Publication Data
US 2019/0332480 A1 Oct. 31, 2019

(30) Foreign Application Priority Data
Apr. 28, 2018 (CN) .......................... 201810399068.X (51) Int. Cl.
*G06F 11/00* (2006.01)
*G06F 11/10* (2006.01)
(Continued)

(52) U.S. Cl.
CPC ...... *G06F 11/1092* (2013.01); *G06F 11/1096* (2013.01); *G06F 11/1435* (2013.01); *G06F 11/28* (2013.01); *G06F 2201/81* (2013.01)

(58) Field of Classification Search
CPC .............. G06F 11/1092; G06F 11/1096; G06F 11/1435; G06F 11/28; G06F 11/1076; G06F 11/142; G06F 2201/81
See application file for complete search history.

(56) References Cited

U.S. PATENT DOCUMENTS 5,758,054 A  5/1998 Katz et al.
5,889,934 A * 3/1999 Peterson .............. G06F 11/1076
                                                    714/6.12
(Continued)

OTHER PUBLICATIONS

Hafner, James L., Veera Deenadhayalan, Wendy Belluomini, and Krishnakumar Rao. "Undetected disk errors in RAID arrays." IBM Journal of Research and Development 52, No. 4.5 (2008): 413-425. (Year: 2008).*

*Primary Examiner* — Anthony J Amoroso
(74) *Attorney, Agent, or Firm* — BainwoodHuang (57) ABSTRACT

Techniques detect incomplete write of data. The techniques involve obtaining metadata associated with a sector in a parity disk of a Redundancy Array of Independent Disks (RAID), wherein the metadata includes a sequence stamp and a partial write flag, the sequence stamp changing with a write operation on a stripe to which the sector belongs, and the partial write flag indicating whether the stripe is partially written. The techniques further involve determining whether incomplete write of data is present in the RAID based on the metadata, and the techniques further involve in response to determining the incomplete write of the data being present in the RAID, rebuilding at least one disk in the RAID. By adding a sequence stamp and a partial write flag in the metadata of the sector of the RAID, incomplete write of data can be detected more accurately, thereby improving the reliability of RAID.

20 Claims, 8 Drawing Sheets

(51) Int. Cl.
*G06F 11/28* (2006.01)
*G06F 11/14* (2006.01)

(56) References Cited

U.S. PATENT DOCUMENTS

| | | |
|---|---|---|
| 7,454,668 B1 | 11/2008 | Yochai et al. |
| 8,839,028 B1 | 9/2014 | Polia et al. |
| 9,910,791 B1 | 3/2018 | Dibb et al. |
| 10,013,354 B2 * | 7/2018 | Flynn ................. G06F 11/1471 |
| 2002/0169995 A1 * | 11/2002 | Archibald, Jr. ..... G06F 11/1076 |
| | | 714/6.12 |

* cited by examiner

METHOD, DEVICE AND COMPUTER PROGRAM PRODUCT FOR DETECTING INCOMPLETE WRITE OF DATA

FIELD

Embodiments of the present disclosure generally relate to the field of data storage, and more specifically, to a method, device and computer program product for detecting incomplete write of data.

BACKGROUND

Redundancy Array of Independent Disks (RAID) is a type of data backup technology, which can combine a plurality of independent physical disks in different ways to form a disk array (i.e., logical disk), thereby providing higher storage performance and better reliability performance than a single disk. In order to recover data in a case that a certain disk in the RAID fails, the RAID is usually provided with one parity check information block (e.g., RAID 5) or multiple parity check information blocks (e.g., RAID 6) therein.

In the RAID technology, a plurality of disks can be accessed simultaneously during the write to a stripe. It is possible that only a part of data is written into the disk due to a hardware fault or a software error, which will lead to stripe data inconsistency, known as "incomplete write." Once the incomplete write occurs, the RAID may lose redundant data. If a fault occurs on an inconsistent stripe, it might be impossible for the RAID group to recover the data. If the RAID group cannot detect the stripe with incomplete write in time, it will cause data damage.

SUMMARY

Embodiments of the present discourse provide a method, device and computer program product for detecting incomplete write of data.

In one aspect of the present disclosure, there is provided a method for detecting incomplete write of data. The method includes obtaining metadata associated with a sector in a parity disk of a RAID, wherein the metadata at least includes a sequence stamp and a partial write flag, the sequence stamp changes with a write operation on a stripe to which the sector belongs, and the partial write flag indicates whether the stripe is partially written. The method further includes determining, based on the metadata, whether incomplete write of data is present in the RAID, and in response to determining the incomplete write of the data being present in the RAID, rebuilding at least one disk in the RAID.

In another aspect of the present disclosure, there is provided a device for detecting incomplete write of data. The device includes a processing unit and a memory coupled to the processing unit and storing instructions thereon. The instructions, when executed by the processing unit, perform actions of obtaining metadata associated with a sector in a parity disk of RAID, wherein the metadata at least includes a sequence stamp and a partial write flag, the sequence stamp changes with a write operation on a stripe to which the sector belongs, and the partial write flag indicates whether the stripe is partially written. The actions further include determining, based on the metadata, whether incomplete write of data is present in the RAID, and in response to determining the incomplete write of the data being present in the RAID, rebuilding at least one disk in the RAID.

In a further aspect of the present disclosure, there is provided a computer program product. The computer program product is tangibly stored on a non-transient computer-readable medium and includes computer-readable instructions, the computer-readable instructions, when executed, cause a computer to perform the method or process according to embodiments of the present disclosure.

The Summary is to introduce a selection of concepts in a simplified form that are further described below in the Detailed Description. This Summary is not intended to identify key features or essential features of the present disclosure, nor is it intended to be used to limit the scope of various embodiments of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same element in the example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments of the present disclosure will be described in more details with reference to the drawings. Although the drawings illustrate some specific embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects unless the context clearly indicates otherwise.

Figure 1:
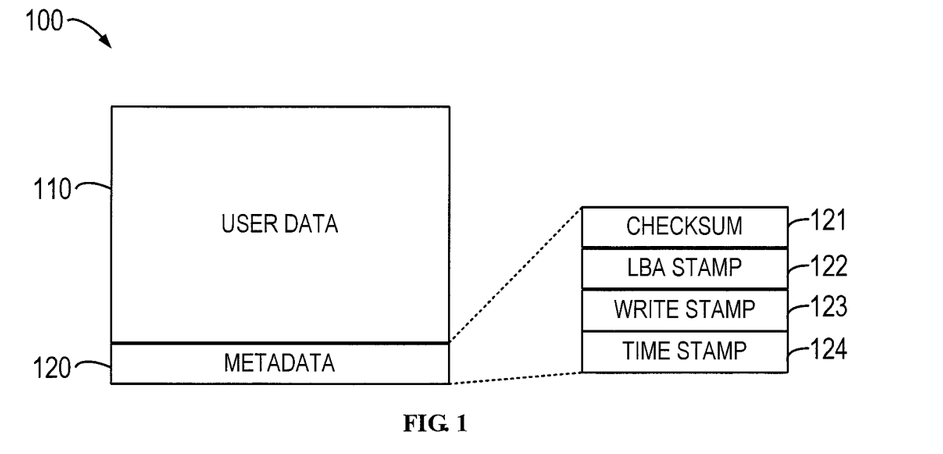
FIG. 1 illustrates a schematic diagram of a conventional structure of a traditional sector in a disk of RAID.

Traditionally, metadata is configured in a sector so as to detect and recover incomplete write of data. For example, FIG. 1 illustrates a schematic diagram of a conventional structure of a traditional sector 100 in a disk of RAID. The sector 100, for example may be 520 bytes, which has 512 bytes of user data 110 and 8 bytes of metadata 120. As shown in FIG. 1, the metadata 120 is divided into four parts: 2 bytes of checksum 121; 2 bytes of Logical Block Address (LBA) label; 2 bytes of write stamp 123, and 2 bytes of time stamp 124.

The checksum 121 is a value of XOR operation of the 512-byte user data and may be used for checking whether the data itself is correct. The LBA stamp 122 is a value of XOR operation of the LBA of the sector and may be used for checking whether the RAID group reads the correct sector. The write stamp 123 indicates data write in the sector and each user disk has a corresponding bit in the write stamp. For example, disk 0 can have a stamp bit 0 and disk 1 can have a stamp bit 1. When a write to full stripe is performed, the write stamps on all disks are set to 0; in case of a partial write, the corresponding bit in write stamp of the written disk will be flipped, and the write stamp of the parity disk is an OR value of the write stamps of all user disks. The full stripe write indicates that the user data involves all user disks while the partial write represents that the user data only involves a part of the user disks. The time stamp 124 is used for indicating a time label; the time stamp on all disks will be set to a random value in case of the full stripe write, while the time stamp on the user disk to which the data is written is set to a fixed value, such as 0X7FFF, in case of the partial write.

Although the traditional design of metadata 120 in FIG. 1 can detect some incomplete writes, some problems still exist. For example, as the write stamp is flipped during partial write, it will be flipped twice after two writes and it will return to the original value. Therefore, the write stamp remains unchanged, and some hardware problems cannot be detected. Besides, for the RAID with more than two parity disks, the traditional method cannot detect which parity disk has the updated data, causing some data damaged. Furthermore, the time stamp is a random value in the traditional metadata structure, so it cannot detect whether the data on the disk is new data or old data. Therefore, the traditional method for detecting incomplete write is poor in accuracy and reliability.

In order to improve accuracy and reliability of the incomplete write detection, embodiments of the present disclosure provide a new solution for detecting incomplete write of data. Embodiments of the present disclosure can detect incomplete write of data more accurately by adding a sequence stamp and a partial write flag in the metadata of the sector of RAID, thereby enhancing reliability of the entire RAID.

Basic principles and several example implementations of the present disclosure are explained below with reference to FIGS. 2 to 7. It should be understood that the example embodiments are provided merely for those skilled in the art to better understand and implement embodiments of the present disclosure and do not restrict the scope of the present disclosure in any manners.

Figure 2:
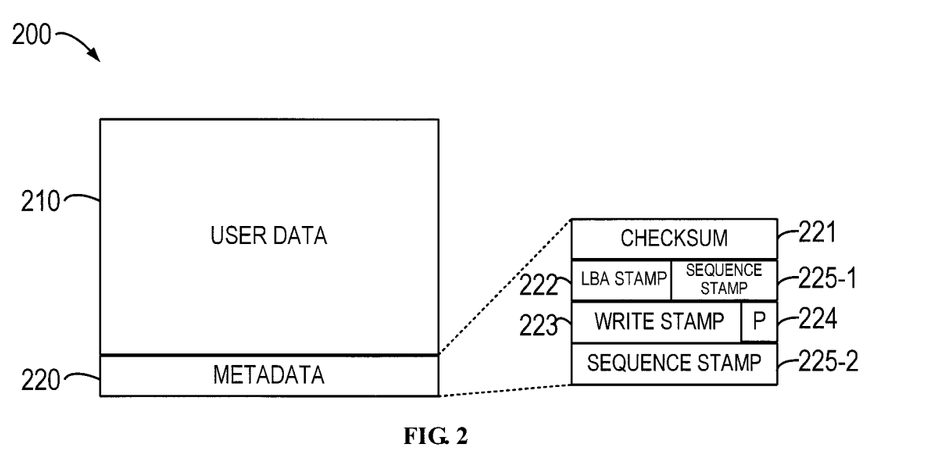
FIG. 2 illustrates a schematic diagram of a structure of a sector in a disk of RAID according to embodiments of the present disclosure.

FIG. 2 illustrates a schematic diagram of an example structure of a sector 200 in a disk of RAID according to embodiments of the present disclosure. As shown in FIG. 2, the sector 200, for example, may be 520 bytes, which has 512 bytes of user data 210 and 8 bytes of metadata 220. In some embodiments, the metadata 220 can be divided into 5 parts: 2 bytes checksum 221, 1 byte of LBA stamp 222, 15 bytes of write stamp 223, 1 bit of partial write flag 224 and 3 bytes of sequence stamp, wherein the sequence stamp includes a first part sequence stamp 225-1 and a second part sequence stamp 225-2, which are collectively known as sequence stamp 225. It should be appreciated that only example division of each part in the metadata 220 is illustrated and the metadata 220 can have more or less parts, and each part may have more or less bytes or bits.

The checksum 221 is a value of XOR operation of the 512-byte user data and may be used for checking whether the data itself is correct. The 1 bit checksum error or multi-bit checksum error may be detected by the checksum; if a certain disk involves the multi-bit checksum error, the disk should be checked offline. The LBA stamp 222 may be generated using for example 8-bit Cyclic Redundancy Check algorithm.

The write stamp 223 indicates data write in the sector and each user disk has a corresponding bit in write stamp. For example, disk 0 has a stamp bit 0 and disk 1 has a stamp bit 1. When a full stripe write is performed, the write stamp on all disks is set to 0; in case of a partial write, the corresponding bit in write stamp of the written disk will be flipped, and the write stamp of the parity disk is an OR value of all user disks. The 15-byte write stamp 223 can support at most 16 disks, such as 15 user disks and 1 parity disk.

The partial write flag 224 indicates whether a stripe to which the sector belongs is partially written. When a full stripe write is performed, the partial write flag on all disks is set to 0; in case of a partial write, the partial write flag in the sector of the user disk to which the data is written is set to 1 and the partial write flag in the sector of the unwritten user disk remains unchanged. The partial write flag in the parity disk is an OR value of the partial write flags of the user disks.

The sequence stamp 225 changes with the write operation on the stripe to which the sector belongs, and the initial value of the sequence stamp, for example, may be set to 0x7FFF. Every time the sector is written, the sequence stamp in the parity disk will correspondingly increase. In case of the full stripe write, the sequence stamp in the entire stripe is increased to a same value; in case of the partial write, the sequence stamp of the written user disk increases to a same value as the sequence stamp of the parity disk. When the value of the sequence stamp reaches a predetermined threshold (e.g., 0x7FFFFF), a full stripe verification is executed and the sequence stamps of all disks are reset to 0x8000.

Different from the traditional metadata structure in the sector, embodiments of the present disclosure provide a new metadata structure for the sector. By adding sequence stamp and partial write flag in the metadata of the sector of RAID, incomplete write of data can be detected more accurately, and reliability of RAID can be improved accordingly.

Figure 3:
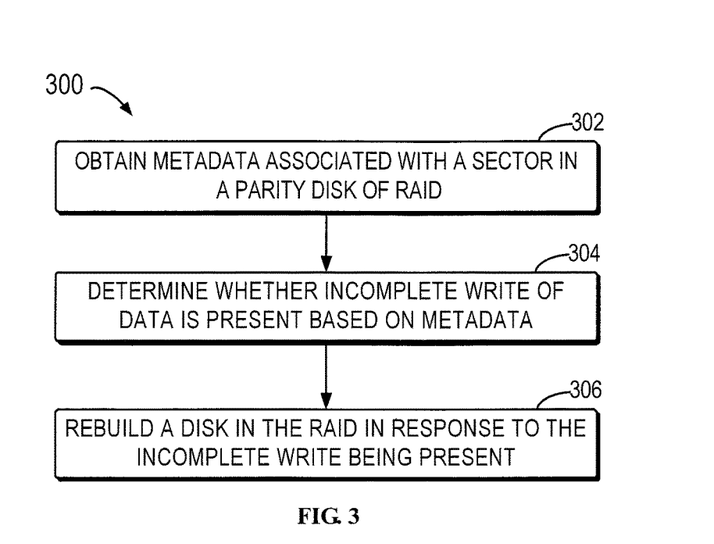
FIG. 3 illustrates a flowchart of a method for detecting incomplete write of data according to embodiments of the present disclosure.

FIG. 3 illustrates a flowchart of a method 300 for detecting incomplete write of data according to embodiments of the present disclosure. At 302, metadata associated with the sector in the parity disk of RAID is obtained, wherein the metadata at least includes a sequence stamp and a partial write flag, the sequence stamp changes with a write operation on the stripe to which the sector belongs and the partial write flag indicates whether the strip is partially written. RAID may include a plurality of user disks and one or more parity disks. In some embodiments, the metadata can be included in the sector, for example, the 520-byte sector can be provided with 8-byte metadata. For example, the metadata 220 as shown in FIG. 2 may be obtained. However, it should be appreciated that the obtained metadata also can exclude the checksum and the LBA stamp as illustrated in FIG. 2.

At 304, it is determined (or ascertained) whether incomplete write of data is present based on the metadata. For example, it is detected whether incomplete write is present in RAID by checking whether a certain condition is satisfied between the metadata. An example implementation of determining whether incomplete write of data is present based on the metadata is described below with reference to FIG. 6.

At 306, in response to determining (or discovering) incomplete write of data being present, at least one disk is rebuilt in RAID. For example, upon detection of presence of incomplete write of data in RAID, it is determined whether a parity disk or a user disk is to be rebuilt based on a fault type of the incomplete write, and it is determined whether data should be rewritten. An example implementation of which disk is rebuilt in RAID is described below with reference to FIG. 6. Therefore, embodiments of the present disclosure can more accurately detect incomplete write of data based on the metadata including sequence stamp and partial write flag.

Figure 4A:
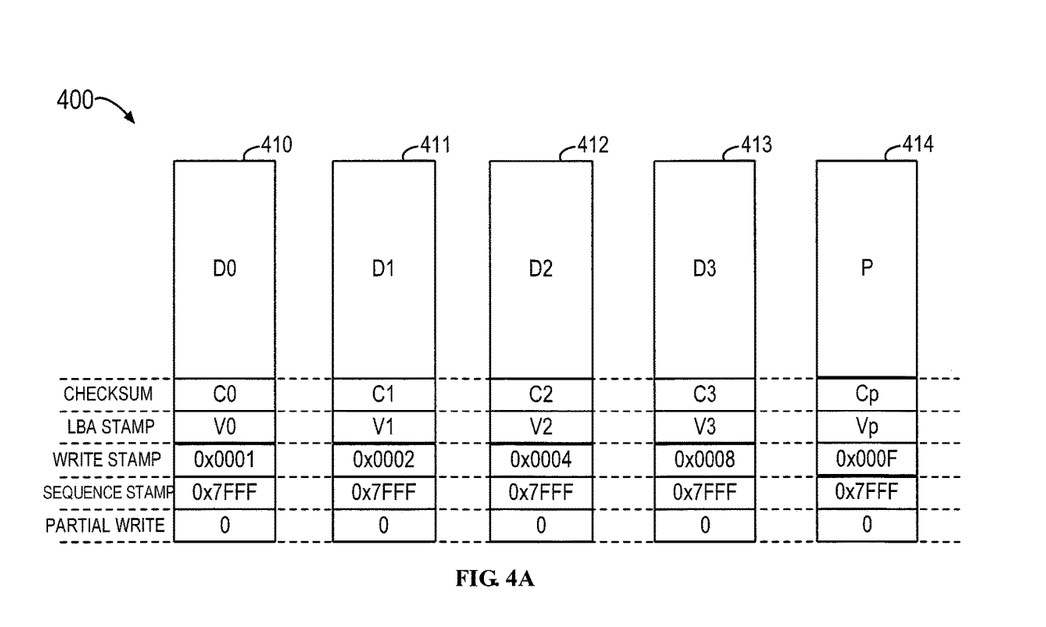
FIG. 4A illustrates a schematic diagram of metadata of the sector according to embodiments of the present disclosure.

FIG. 4A illustrates a schematic diagram 400 of metadata of the sector according to embodiments of the present disclosure. The RAID 5 as shown in FIG. 4A includes four user disks 410, 411, 412 and 413 and one parity disk 414. Checksum and LBA stamp of each disk in RAID are determined respectively according to data of the sector and LBA. The write stamp is updated based on the write situation, and the write stamp of each user disk has two values corresponding to its position, i.e., the value of the write stamp of the user disk 410 is 0x0000 or 0x0001; the value of the write stamp of the user disk 411 is 0x0000 or 0x0002; the value of the write stamp of the user disk 412 is 0x0000 or 0x0004; the value of the write stamp of the user disk 413 is 0x0000 or 0x0008; and the value of the parity disk 414 is OR value of the write stamps of the four user disks.

Figure 4B:
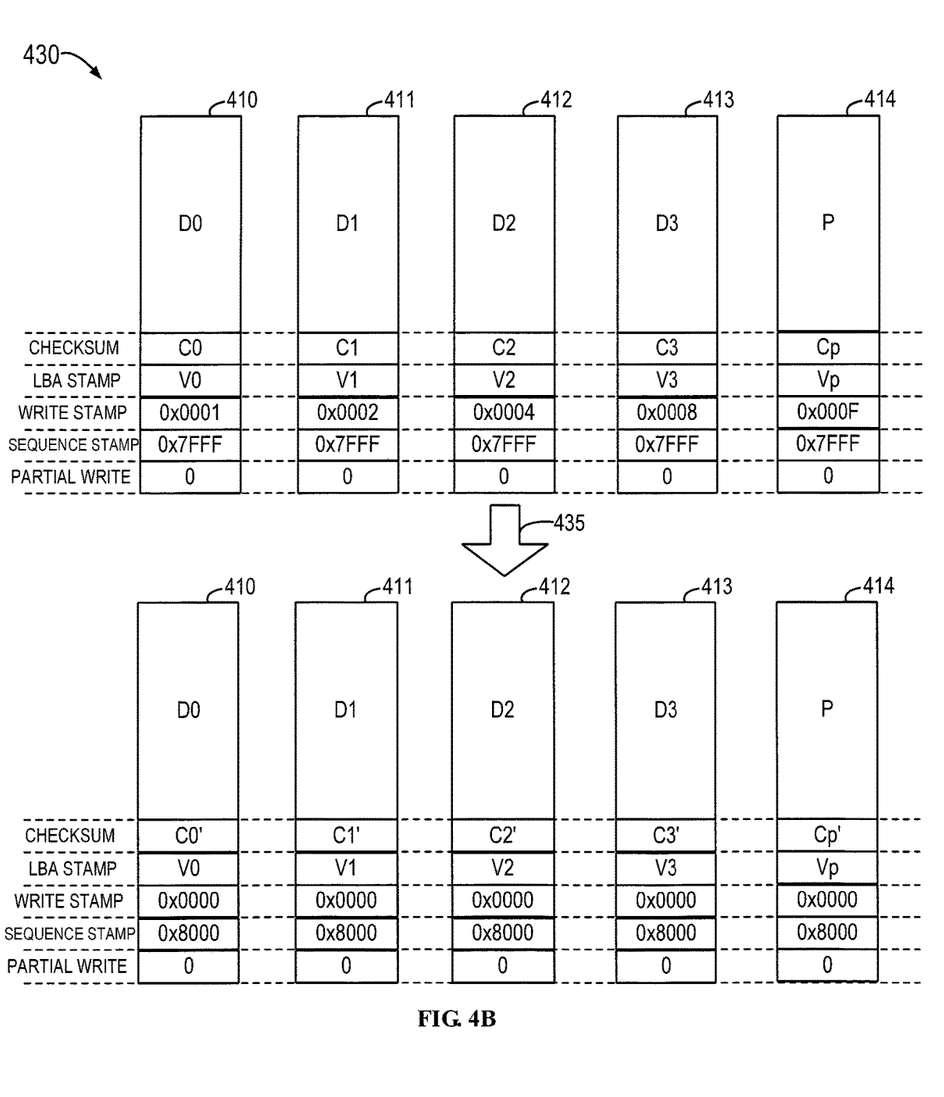
FIG. 4B illustrates a schematic diagram of an update to the metadata during the write to full stripe according to embodiments of the present disclosure.

FIG. 4B illustrates a schematic diagram 430 of an update to metadata during a full stripe write according to embodiments of the present disclosure. As shown in FIG. 4B, in case of the full stripe write, the write stamp of all disks is set to 0x0000, the sequence stamp of all disks is increased to 0x8000 and the partial write flag of all disks is set to 0. Besides, as the data in the sector changes, the checksum is also updated correspondingly.

Figure 4C:
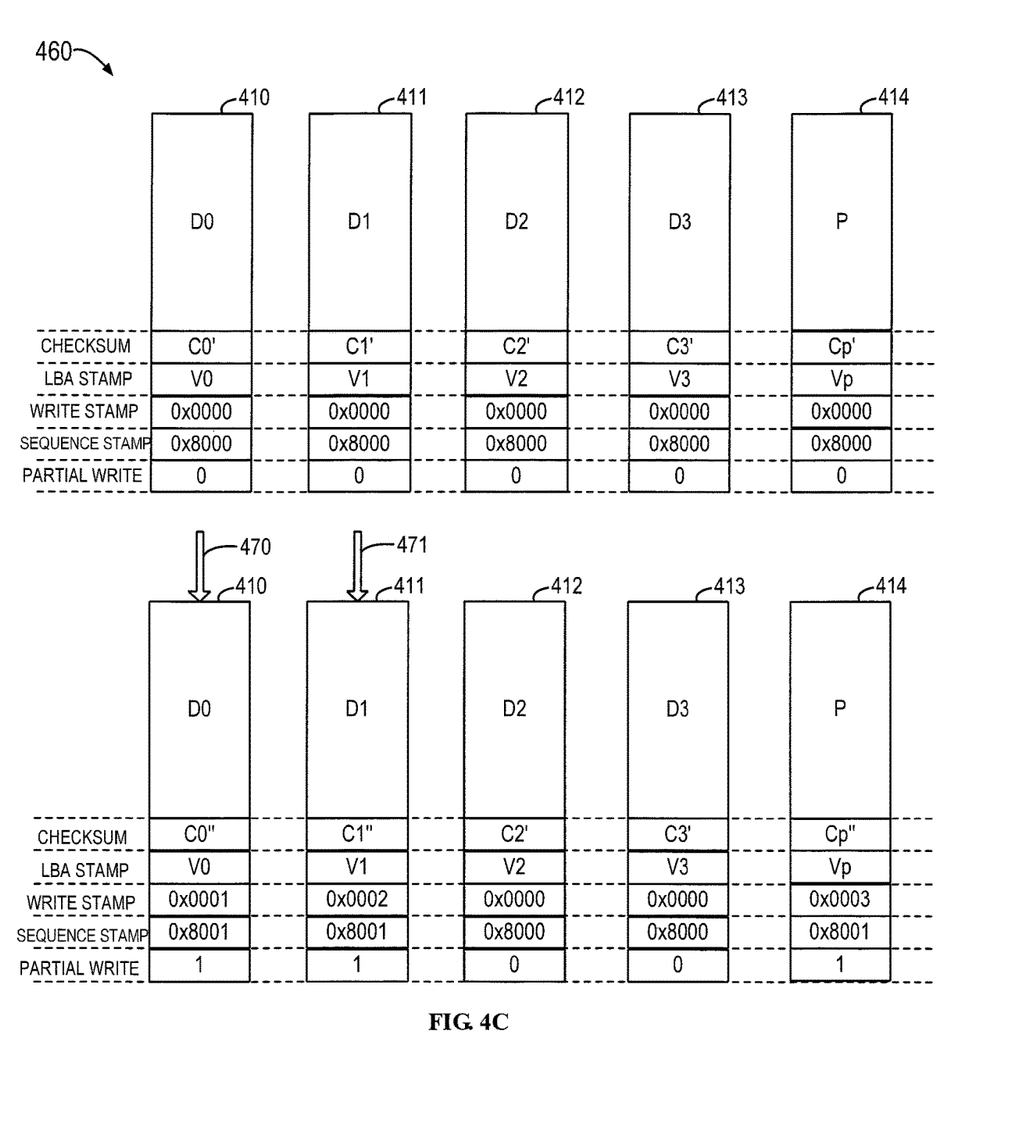
FIG. 4C illustrates a schematic diagram of an update to the metadata in case of partial write to the stripe according to embodiments of the present disclosure.

FIG. 4C illustrates a schematic diagram 460 of an update to metadata in case of partial write of the stripe according to embodiments of the present disclosure. Because the partial writes 470 and 471 only involve the sectors of the stripe in the user disks 410 and 411, the values at the corresponding positions of the write stamps of the sectors in the user disks 410 and 411 are flipped, such that the write stamps in the user disks 410 and 411 change and the write stamp in the parity disk 414 also changes correspondingly. The sequence stamps of the user disks 410 and 411 and the parity disk 414 are increased to 0x8001. The partial write flags of the user disks 410 and 411 and the parity disk 414 are updated to 1. In addition, the checksum is also correspondingly updated as the data in the sectors of a part of the disks changes.

Figure 4D:
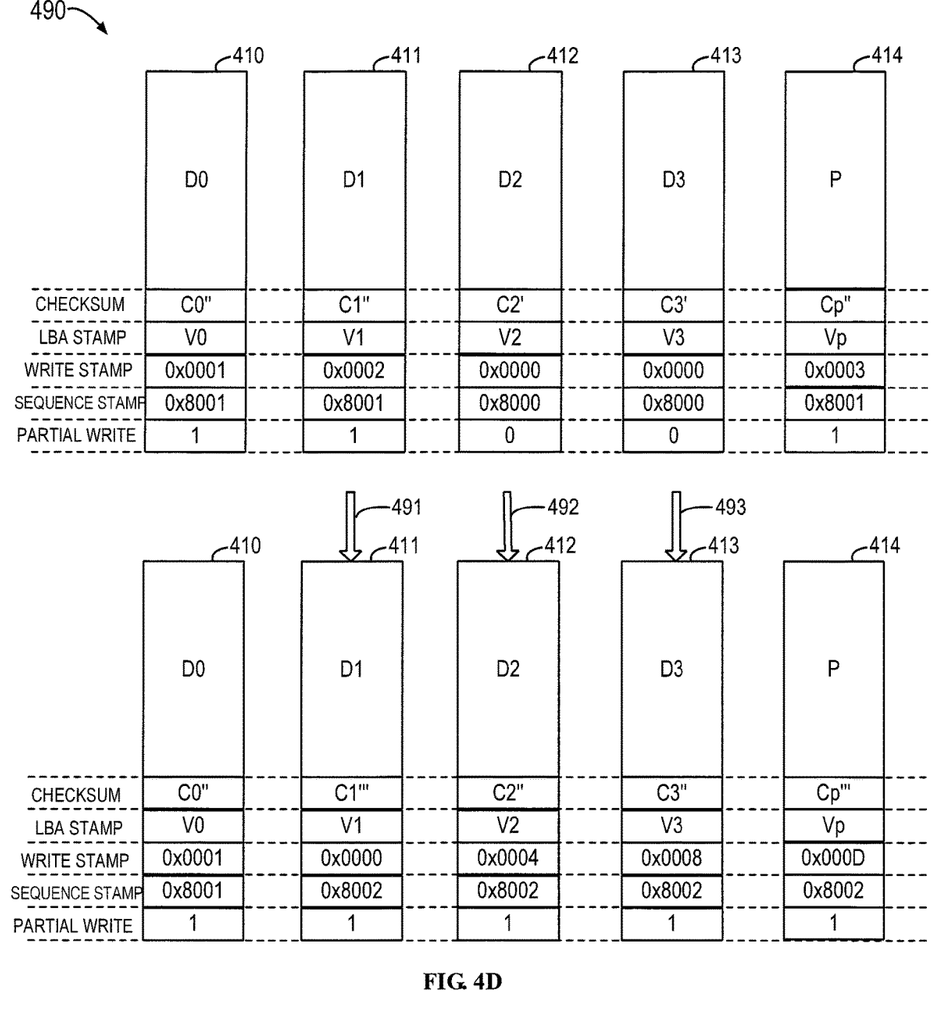
FIG. 4D illustrates a further schematic diagram of an update to the metadata in case of partial write of the stripe according to embodiments of the present disclosure.

FIG. 4D illustrates a further schematic diagram 490 of an update to metadata in case of partial write of the stripe according to embodiments of the present disclosure. Because the partial writes 491, 492 and 493 only involve the sectors in the user disks 411, 412 and 413 of the stripe, the values at the corresponding positions of the write stamps of the sectors in the user disks 411, 412 and 413 are flipped, such that the write stamps in the user disks 411, 412 and 413 change and the write stamp in the parity disk 414 also changes correspondingly. The sequence stamps of the user disks 411, 412 and 413 and the parity disk 414 are increased to 0x8002. The partial write flags of the user disks 411, 412 and 413 and the parity disk 414 are updated or maintained to 1. In addition, the checksum is also correspondingly updated as the data in the sectors of a part of the disks changes.

Figure 5:
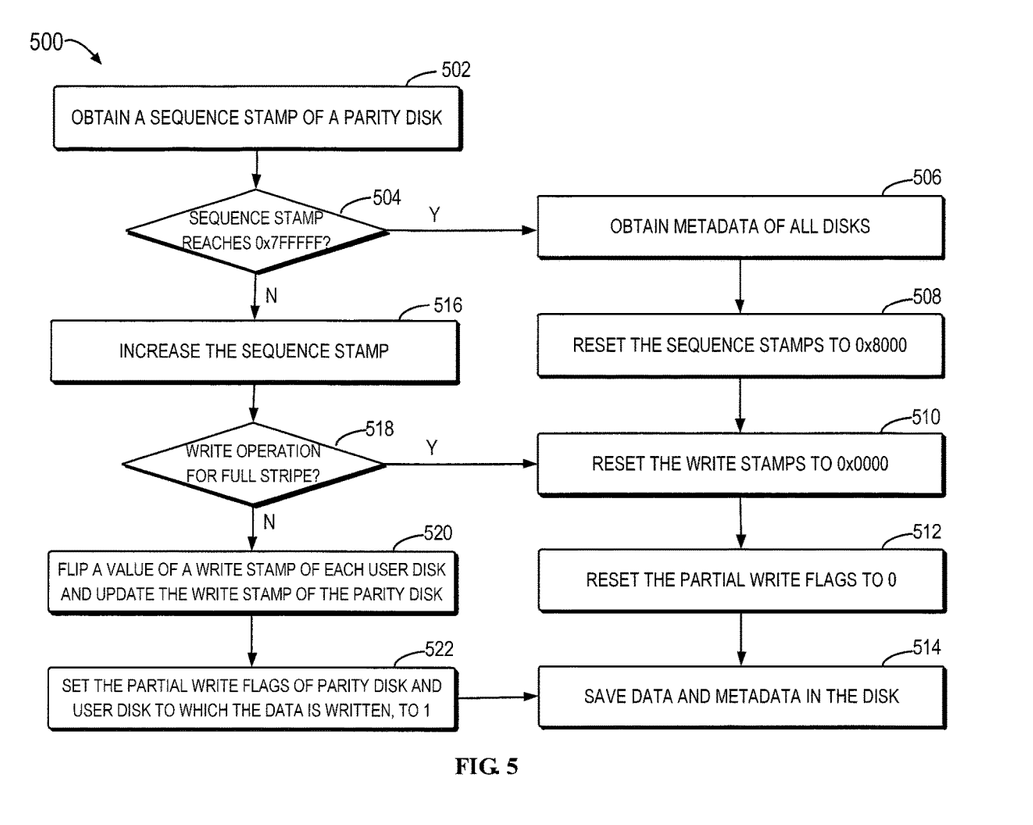
FIG. 5 illustrates a schematic diagram of a process for updating the metadata during data write according to embodiments of the present disclosure.

FIG. 5 illustrates a schematic diagram of a process 500 for updating the metadata during data write according to embodiments of the present disclosure. It should be appreciated that the process 500 may be executed prior to the action 302 in the method 300 described above with reference to FIG. 3.

At 502, a sequence stamp of the parity disk is obtained. At 504, it is determined whether the sequence stamp reaches a predetermined threshold, e.g., 0x7FFFFF. If the sequence stamp reaches the predetermined threshold, the metadata of all disks is obtained at 506, and the sequence stamps of all disks are reset to 0x8000 at 508. Next, the write stamps of all disks are set to 0x0000 at 510 and the partial write flags of all disks are set to 0 at 512, and then the data and metadata are saved in the disk at 514.

If it is determined that the sequence stamp does not reach the predetermined threshold at 504, the sequence stamp is increased, for example, by 1 at 516. It is determined whether the write operation is for the full stripe at 518. If it is the full stripe write, the write stamps of all disks are set to 0x0000 at 510 and the partial write flags of all disks are set to 0 at 512, and then the data and metadata are saved in the disk at 514. If the write operation is a partial write instead of a full stripe write, the write stamp value corresponding to each user disk is flipped and the write stamp of the parity disk is correspondingly updated at 520, and the partial write flags of the parity disk and the user disks to which the data is written are set to 1 at 522, then, the data and metadata are saved in the disk at 514.

It can be detected whether incomplete write of data is present in RAID by using the metadata configured according to the embodiments of the present disclosure. Moreover, during the detection of incomplete write in RAID, if the metadata cannot satisfy the following 8 rules, it indicates the presence of incomplete write of data.

Rule 1: if the partial write flag in the metadata is 0, the write stamp of the metadata should also be 0.

Rule 2: the write stamp of a user disk should be 0x0000 or only the corresponding position bit is set to 1. For example, the write stamp only can be 0x0000 or 0x0008 for the user disk at position 3.

Rule 3: bits of the write stamp of the parity disk should not exceed the number of user disks. For example, if there are four user disks, the write stamp of the parity disk should not be above 0xF (4 bits).

Rule 4: the parity disk always has the maximum sequence stamp.

Rule 5: there should be at least one user disk having the same sequence stamp as the parity disk.

Rule 6: the disk with a partial write flag 0 should have the lowest sequence stamp.

Rule 7: the disk with a partial write flag 0 should have the same sequence stamp.

Rule 8: the write stamp of the parity disk should be an OR value of the write stamps of all user disks.

It is stipulated that rules 1-3 may be detected separately on each disk; if the metadata fails to meet the rules 1-3, it is possible that some software or hardware fault(s) exist and the data in the disk should be invalidated and recovered by other disks. The rules 4-8 should be detected by comparison across the metadata in a plurality of disks.

Figure 6:
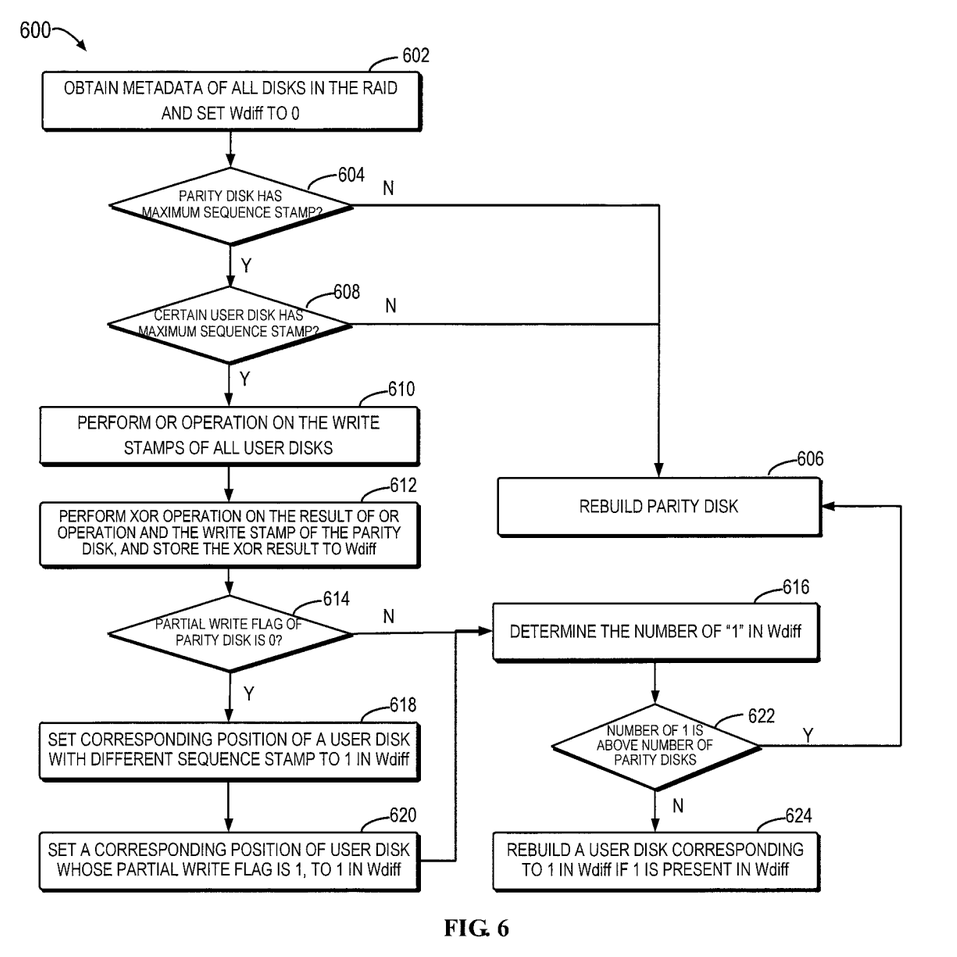
FIG. 6 illustrates a schematic diagram of a process for detecting incomplete write of data according to embodiments of the present disclosure.

FIG. 6 illustrates a schematic diagram of a process 600 for detecting incomplete write of data according to embodiments of the present disclosure. It should be appreciated that the process 600 may be an example implementation of actions 304 and 306 in the above method 300 described with reference to FIG. 3.

At 602, metadata in all disks of a certain stripe of RAID is obtained, and a variable Wdiff for locating a disk involving incomplete write is initialized. The variable Wdiff has a same number of bits as the number of the disks in RAID, and the bit at each position indicates incomplete write of a corresponding disk. For example, if the disk 0 has incomplete write, the value of the bit 0 in Wdiff is set to "1." It is determined whether the parity disk has the maximum sequence stamp at 604. If the parity disk does not have the maximum sequence stamp, it means that the incomplete write is present on the parity disk. Therefore, the parity disk is rebuilt at 606, data in the parity disk is recovered and the write operation is re-executed.

If the parity disk has the maximum sequence stamp, it is determined whether a certain user disk also has the maximum sequence stamp at 608. If no user disk has the maximum sequence stamp, it means that the data is only written into the parity disk without writing to the user disk. Therefore, the parity disk should be rebuilt at 606, the data in the parity disk should be recovered and the write operation should be re-executed. If there is one or some user disks have the maximum sequence stamp, the OR operation is performed on the write stamps of all user disks at 610, and an XOR operation is performed on the OR result and the write stamp of the parity disk at 612, and then the XOR result is stored to Wdiff.

Next, it is determined whether the partial write flag of the parity disk is a second value (e.g. 0). If the partial write flag of the parity disk is a first value (e.g., 1), it means that the previous operation is a partial stripe write, rather than a full stripe write, and the number of "1" in Wdiff is determined (or ascertained) at 616. If the partial write flag of the parity disk is the second value (e.g., 0), it means that the previous operation is a full stripe write. At this time, the sequence stamps of all disks should be the same and the partial write flags of all disks should be "0." The corresponding positions of the user disks having different sequence stamps are set to "1" in Wdiff at 618, and a corresponding position of the user disk having the partial write flag 1 is set to 1 in Wdiff at 620. Afterwards, the number of "1" in Wdiff is determined at 616.

At 622, it is determined whether the number of "1" in Wdiff is above the number of parity disks in RAID. If the number of "1" in Wdiff is above the number of parity disks in RAID, the data cannot be directly recovered and it is required that the parity disk is rebuilt at 606 and the data is re-written. If the number of "1" in Wdiff is smaller than or equal to the number of parity disks in RAID (when "1" is present in Wdiff), the user disk corresponding to "1" in Wdiff may be rebuilt without rewriting the data. It should be understood that the disk is rebuilt in RAID only when "1" is present in Wdiff. In other words, if "1" is absent in Wdiff, it means that RAID does not have any incomplete write, so there is no need to rebuild any disk.

Figure 7:
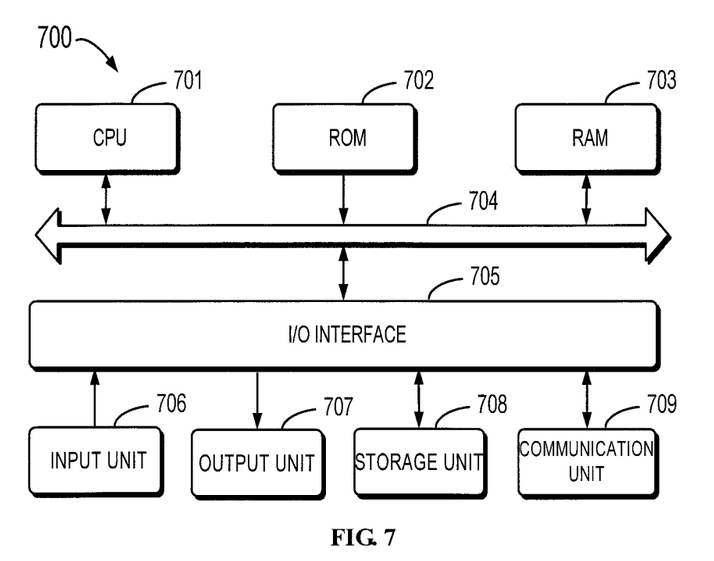
FIG. 7 illustrates a schematic block diagram of a device for implementing embodiments of the present disclosure.

FIG. 7 illustrates a schematic block diagram of an example device 700 for implementing embodiments of the present disclosure. As shown, the device 700 includes a central process unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the device 700 are connected to the I/O interface 705, including: an input unit 706, such as keyboard, mouse and the like; an output unit 707, e.g., various kinds of display and loudspeakers etc.; a storage unit 708, such as disk and optical disk etc.; and a communication unit 709, such as network card, modem, wireless transceiver and the like. The communication unit 709 allows the device 700 to exchange information/data with other devices via the computer network, such as Internet, and/or various telecommunication networks.

The above described each method or procedure can also be executed by the processing unit 701. For example, in some embodiments, the method can be implemented as a computer software program tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, one or more steps or actions of the above described method or procedure may be implemented.

In some embodiments, the above described method and procedure may be implemented as computer program product. The computer program product may include a computer-readable storage medium, on which the computer-readable program instructions for executing various aspects of the present disclosure are loaded.

The computer-readable storage medium may be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, and traditional procedural programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only by way of example rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable other ordinary skilled in the art to understand embodiments of the present disclosure.

We claim:

1. A method for detecting incomplete write of data, comprising:
   obtaining metadata associated with a sector in a parity disk of a Redundancy Array of Independent Disks (RAID), the metadata at least including a sequence stamp and a partial write flag, the sequence stamp changing with a write operation on a stripe to which the sector belongs, the partial write flag indicating whether the stripe is partially written;
   determining, based on the metadata, whether incomplete write of data is present in the RAID; and
   in response to determining the incomplete write of the data being present in the RAID, rebuilding at least one disk in the RAID;
   wherein the metadata further includes a write stamp indicating data write in the sector;
   wherein determining whether incomplete write of data is present in the RAID comprises:
   in response to a relationship between the write stamp and other write stamps of other disks in the RAID failing to meet a predetermined condition, determining a disk in the RAID involving the incomplete write; and wherein determining the disk in the RAID involving the incomplete write comprises:
in response to the partial write flag being a first value, determining a first disk in the RAID involving the incomplete write based on the write stamp; or
in response to the partial write flag being a second value, determining a second disk in the RAID involving the incomplete write based on the write stamp, the sequence stamp and the partial write flag.

2. The method of claim 1, wherein determining whether incomplete write of data is present in the RAID further comprises:
determining, by comparing the sequence stamp of the parity disk and sequence stamps of the other disks in the RAID, whether the incomplete write of the data is present in the RAID.

3. The method of claim 1, wherein the metadata further includes a checksum of data in the sector, and a Logical Block Address (LBA) stamp associated with a LBA of the sector.

4. The method of claim 3, wherein determining whether incomplete write of data is present in the RAID further comprises:
determining, based on the relationship between the write stamp of the parity disk and the other write stamps of other disks in the RAID, whether the incomplete write of the data is present in the RAID.

5. The method of claim 1, wherein rebuilding at least one disk in the RAID comprises:
in response to the number of disks involving the incomplete write being above the number of parity disks in the RAID, rebuilding the parity disk; and
in response to the number of disks involving the incomplete write being below the number of parity disks in the RAID, rebuilding the disk involving the incomplete write.

6. The method of claim 1, further comprising:
in response to data being written into the sector, obtaining the sequence stamp;
in response to the sequence stamp reaching a predetermined threshold, resetting the sequence stamp; and
in response to the sequence stamp failing to reach the predetermined threshold, increasing the sequence stamp.

7. The method of claim 6, further comprising:
in response to the data being written into the sector, determining whether the write of the data involves all sectors in the stripe;
in response to determining the write of the data failing to involve all sectors in the stripe, setting the partial write flag to the first value; and
in response to determining the write of the data involving all sectors in the stripe, setting the partial write flag to the second value.

8. The method of claim 1, wherein rebuilding the at least one disk in the RAID includes:
rebuilding a user disk of the RAID, the user disk being different from the parity disk of the RAID.

9. A device for detecting incomplete write of data, comprising:
a processing unit; and
a memory coupled to the processing unit and storing instructions thereon, the instructions, when executed by the processing unit, performing actions of:
obtaining metadata associated with a sector in a parity disk of a Redundancy Array of Independent Disks (RAID), the metadata at least including a sequence stamp and a partial write flag, the sequence stamp changing with a write operation on a stripe to which the sector belongs, the partial write flag indicating whether the stripe is partially written;
determining, based on the metadata, whether incomplete write of data is present in the RAID; and
in response to determining the incomplete write of the data being present in the RAID, rebuilding at least one disk in the RAID;
wherein the metadata further includes a write stamp indicating data write in the sector;
wherein determining whether incomplete write of data is present in the RAID further comprises:
in response to a relationship between the write stamp and other write stamps of other disks in the RAID failing to meet a predetermined condition, determining a disk in the RAID involving the incomplete write;
wherein the determining the disk in the RAID involving the incomplete write comprises:
in response to the partial write flag being a first value, determining a first disk in the RAID involving the incomplete write based on the write stamp; or
in response to the partial write flag being a second value, determining a second disk in the RAID involving the incomplete write based on the write stamp, the sequence stamp and the partial write flag.

10. The device of claim 9, wherein determining whether incomplete write of data is present in the RAID further comprises:
determining, by comparing the sequence stamp of the parity disk and sequence stamps of the other disks in the RAID, whether the incomplete write of the data is present in the RAID.

11. The device of claim 9, wherein the metadata further includes a checksum of data in the sector, and a Logical Block Address (LBA) stamp associated with a LBA of the sector.

12. The device of claim 11, wherein determining whether incomplete write of data is present in the RAID further comprises:
determining, based on the relationship between the write stamp of the parity disk and the other write stamps of other disks in the RAID, whether the incomplete write of the data is present in the RAID.

13. The device of claim 9, wherein rebuilding at least one disk in the RAID comprises:
in response to the number of disks involving the incomplete write being above the number of parity disks in the RAID, rebuilding the parity disk; and
in response to the number of disks involving the incomplete write being below the number of parity disks in the RAID, rebuilding the disk involving the incomplete write.

14. The device of claim 9, further comprising:
in response to data being written into the sector, obtaining the sequence stamp;
in response to the sequence stamp reaching a predetermined threshold, resetting the sequence stamp; and
in response to the sequence stamp failing to reach the predetermined threshold, increasing the sequence stamp.

15. The device of claim 14, further comprising:
in response to the data being written into the sector, determining whether the write of the data involves all sectors in the stripe;

in response to determining the write of the data failing to involve all sectors in the stripe, setting the partial write flag to the first value; and in response to determining the write of the data involving all sectors in the stripe, setting the partial write flag to the second value.

16. The device of claim 9, wherein rebuilding the at least one disk in the RAID includes:

rebuilding a user disk of the RAID, the user disk being different from the parity disk of the RAID.

17. A computer program product having a non-transitory computer readable medium which stores a set of instructions for detecting incomplete write of data; the set of instructions, when carried out by computerized circuitry, causing the computerized circuitry to perform a method of:

obtaining metadata associated with a sector in a parity disk of a Redundancy Array of Independent Disks (RAID), the metadata at least including a sequence stamp and a partial write flag, the sequence stamp changing with a write operation on a stripe to which the sector belongs, the partial write flag indicating whether the stripe is partially written;

determining, based on the metadata, whether incomplete write of data is present in the RAID; and in response to determining the incomplete write of the data being present in the RAID, rebuilding at least one disk in the RAID;

wherein the metadata further includes a write stamp indicating data write in the sector;

wherein determining whether incomplete write of data is present in the RAID comprises:

in response to a relationship between the write stamp and other write stamps of other disks in the RAID failing to meet a predetermined condition, determining a disk in the RAID involving the incomplete write; and wherein determining the disk in the RAID involving the incomplete write comprises:

in response to the partial write flag being a first value, determining a first disk in the RAID involving the incomplete write based on the write stamp; or in response to the partial write flag being a second value, determining a second disk in the RAID involving the incomplete write based on the write stamp, the sequence stamp and the partial write flag.

18. The computer program product of claim 17, wherein rebuilding the at least one disk in the RAID includes:

rebuilding a user disk of the RAID, the user disk being different from the parity disk of the RAID.

19. The computer program product of claim 17, wherein the metadata further includes a checksum of data in the sector, and a Logical Block Address (LBA) stamp associated with a LBA of the sector.

20. The computer program product of claim 19, wherein determining whether incomplete write of data is present in the RAID further comprises:

determining, based on the relationship between the write stamp of the parity disk and the other write stamps of other disks in the RAID, whether the incomplete write of the data is present in the RAID.

* * * * *